Aug. 6, 1968          H. A. BRANDT                3,395,950
         VEHICLE WHEEL HUB BEARING OIL BATH ADAPTOR
                  Filed March 14, 1966
FIG. 1
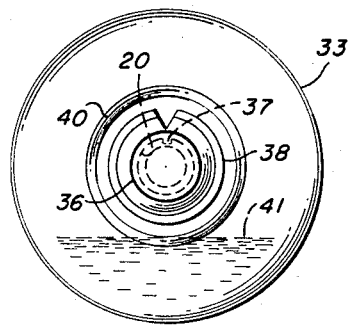
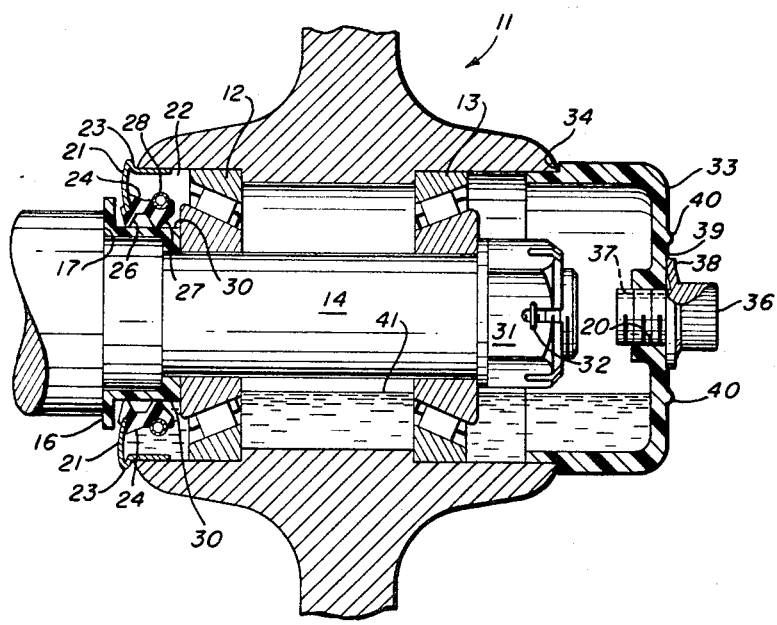
FIG. 2
                                    INVENTOR.
                              HAROLD A. BRANDT
                           BY
                           Richard K. Macneill

United States Patent Office 3,395,950
Patented Aug. 6, 1968

3,395,950
VEHICLE WHEEL HUB BEARING OIL BATH ADAPTOR
Harold A. Brandt, San Diego, Calif.; assignor of one-third to Roland L. Willett, San Diego, Calif., and one-third to James A. Tindal, Gardena, Calif.
Filed Mar. 14, 1966, Ser. No. 534,112
1 Claim. (Cl. 308—36.2)

The present invention relates to a vehicle wheel hub bearing oil bath adaptor and more particularly to a vehicle wheel hub bearing oil bath adaptor which can be installed on existing axles without modification thereof.

Although the present invention is particularly useful in trailer wheel bearings and is particularly adapted for resolving present problems attendant therewith, it is to be understood that it is also applicable to other wheel axles. The prior art adaptors have been plagued with many disadvantages, the main disadvantage being the necessity to machine existing spindles to effect a sealed fitting thereon. This of course not only weakens the axle spindle but requires the expensive operation of modifying the axle spindle itself prior to installation of the oil bath hub. Other disadvantages have stemmed from the location of a fill port peripherally around the hub rather than centrally and the absence of pressure temperature relief due to the sealing of the entire unit.

According to the invention, a vehicle wheel hub bearing oil bath adaptor is provided which utilizes an adaptor plate which fits existing axle spindles without modification thereof and a center fill port which obviates the possibility of loss of lubrication should the fill plug be damaged and provides a convenient pressure release in the event of a temperature build up.

An object of the present invention is the provision of a vehicle wheel hub bearing oil bath adaptor which can be installed on existing wheel axle spindles without modification thereof.

Another object is to provide a vehicle wheel hub bearing oil bath adaptor having an axial fill port.

A further object of the invention is the provision of a vehicle wheel hub bearing oil bath adaptor having a pressure relief valve which is an integral part of the fill port plug.

Still another object is to provide a vehicle wheel hub bearing oil bath adaptor which is inexpensive to manufacture, extremely simple to install, and has an extremely long life.

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 1 is an end view of the preferred embodiment of the present invention; and

FIG. 2 is an enlarged sectional view of the embodiment of FIG. 1 taken on line 2—2 of FIG. 1.

According to the invention, an adaptor plate is provided for a snug fit over a reduced diameter portion of an axle spindle. An oil seal is placed over the adaptor plate and communicates with the adaptor plate and the hub. A transparent hub cap is placed on the outer end of the wheel bearings which can be standard wheel bearings. The transparent hub cap has an axially, i.e., centrally located fill port with a fill port plug threadably inserted in threadable communication therewith. The fill port is equipped with a slot which provides pressure relief yet remains sealed under normal conditions, and from elements external to the hub cap.

Referring to the drawings, a hub is shown generally at 11 carrying standard wheel bearings 12 and 13 therein. Axle spindle 14 is carried by wheel bearings 12 and 13. Adaptor plate 16 snugly abuts shoulder 17 of axle spindle 14. Seal ring 21 is press fit within surface 22 of spindle 11 and has a peripheral limiting lip 23 for limiting travel within hub 11. Seal 24 has two lips 26 and 27; lip 26 having a recess fixedly attached to seal ring 21 and lip 27 having a recess carrying spring 28. Lips 26 and 27 ride snugly on adaptor plate 16.

Retaining nut 31 holds the entire assembly in place, cotter pin 32 assuring against loosening of retaining nut 31. Transparent hub cap 33 is press fit within hub 11 to shoulder 34 which is preferably made of a transparent plastic for simplicity of manufacture and durability. Threaded oil fill port 20 cooperates with threaded oil fill port plug 36. Threaded oil fill port plug 36 has a pressure and temperature relief slot 37 cut therein which provides venting through a seal comprising lip 38 of oil fill port plug 36 and surface 39 of hub cap 33.

ASSEMBLY AND OPERATION

In assemblying and installing the present invention, the axle spindle of a trailer, for example, is thoroughly cleaned, particularly if the instant invention is utilized as a replacement item, and the adaptor plate 16 mounted on axle spindle 14. An epoxy is preferably utilized to insure a snug and lasting fit of adaptor plate 16 on axle spindle 14. If oil fill ring 21 is not already mounted on adaptor plate 16, it is then slideably mounted over surface 30 of adaptor plate 16. The axle is then placed within bearings 12 and 13, bearing 13 abutting adaptor plate 16. Retaining nut 31 can be placed on the threaded portion of axle spindle 14 and cotter pin 32 secured. Sealing ring 23 is then gently tapped into hub 11, making a press fit with surface 22 with lip 23 abutting the inner end of hub 11.

Transparent hub cap 33 is then pressed into place within hub 11 until shoulder 34 abuts the outside end of hub 11. Oil is then poured into oil fill port 34 of transparent hub cap 33 until it reaches an oil level indicator ring 40. Oil fill port plug 36 is then threadably inserted into oil fill port 34 and the unit is ready for use.

Should the unit be backed into water, as is common with boat trailers, the seal effected by lip 38 of oil fill port plug 36 will prevent any water from entering the unit through pressure relief slot 37. On the other hand, should the unit be driven into the desert for example, resulting in an increase of temperature and an attendant increase of pressure, this will be vented through slot 37. The reason that air can be vented out of relief slot 37 and water not be taken in is that any water would be working with the seal of lip 38 and the air venting out will be working against this seal. It can be seen that should the fill plug 36 be damaged, very little oil would be lost since in a rest position the oil will collect in the bottom of the unit as shown at 41, and in motion the oil will be carried by bearings 12 and 13 to the periphery of the unit and away from the center thereof. Were the fill port to be located near shoulder 34 for example of hub cap 33, the opposite would be true and serious oil loss would result from a damaged or missing oil fill port plug.

It should be understood of course that the foregoing disclosure relates to only a preferred embodiment of the invention and that it is intended to cover all changes and modifications of the example of the invention herein chosen for the purposes of the disclosure which do not constitute departures from the spirit and scope of the invention.

What is claimed is:
1. A vehicle wheel hub bearing oil bath adaptor for adapting oil bath lubrication to existing vehicle wheel axles of the type having a main diameter portion, an outer reduced diameter portion for the mounting of a wheel hub thereon and an intermediately reduced diameter portion between said main diameter portion and said outer reduced diameter portion, said intermediately reduced diameter portion defining a first shoulder with said main diameter portion and a second shoulder with said outer reduced diameter portion, said adaptor comprising:

an adaptor member dimensioned for a snug fit over said intermediately reduced diameter portion, one end of said adaptor member being provided with an annular inwardly extending flange shaped to fit over said second shoulder and the other end of said adaptor member being provided with an annular outwardly extending flange for abutment with said first shoulder;

an annular seal adapted to encircle said adaptor member between the flanged ends thereof and in contact with the outer surface of said adaptor member to provide a frictional seal between said adaptor member and the wheel hub when the adaptor member is mounted on said axle, said seal also including an annular outwardly extending flange around the end thereof adjacent the outwardly extending flange of the adaptor member whereby said outwardly extending flanges facilitate positioning of the adaptor member and seal with respect to the axle and the wheel hub;

spring means carried by and encircling said annular seal intermediate the ends thereof for producing uniform constant contact between the seal and said outer surface of the adaptor member;

and a hub cap dimensioned for a snug press fit within the wheel hub when mounted on said axle on an opposite end of said hub from said annular seal, said hub cap including an oil fill port positioned for axial alignment with the axle and threaded plug means for closing said port against the admission of external fluids, said plug means including an external vent channel formed along the length of the threaded portion of said plug means to permit the venting of undesired buildup in internal pressure.

References Cited

UNITED STATES PATENTS

| | | | |
|---|---|---|---|
| 3,072,413 | 1/1963 | Parks | 277—153 X |
| 3,199,318 | 8/1965 | Sullivan et al. | 308—187.1 X |
| 2,224,296 | 12/1940 | Hoffman | 220—44 X |
| 2,225,395 | 12/1940 | Young | 220—44 X |
| 2,933,102 | 4/1960 | Hillman et al. | 220—44 X |
| 3,089,738 | 5/1963 | Steiner | 308—187 |
| 3,114,579 | 12/1963 | Isenbarger | 301—108 |

LAVERNE D. GEIGER, *Primary Examiner.*

E. J. EARLS, *Assistant Examiner.*